C. J. PERKINS.
MOLD FOR PLASTIC BLOCKS.
APPLICATION FILED OCT. 9, 1916.
1,219,348.
Patented Mar. 13, 1917.
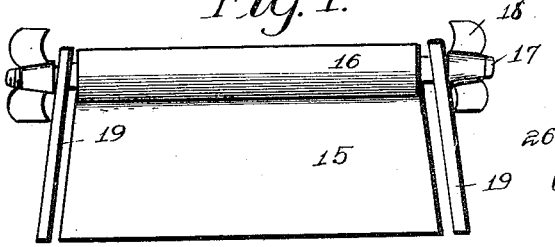
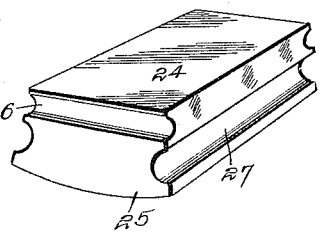
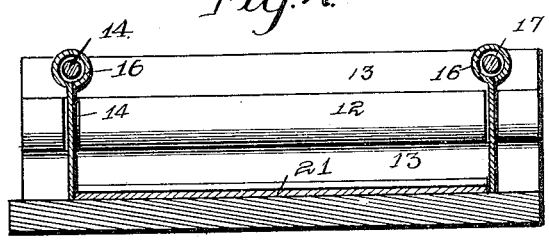
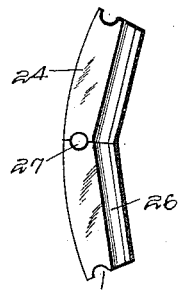
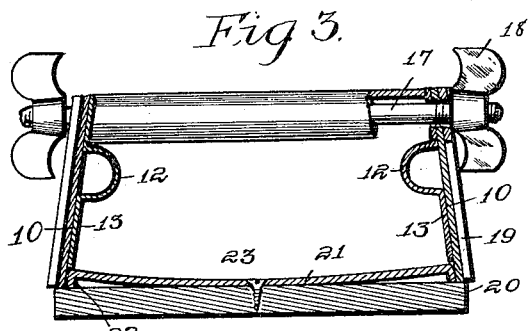
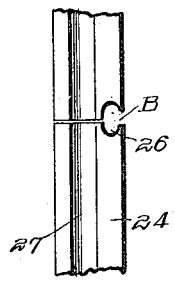
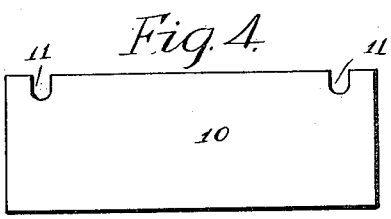
Witness
A. G. Hague.
Inventor
Chas. J. Perkins
by Orwig & Bair Attys.

UNITED STATES PATENT OFFICE.

CHARLES J. PERKINS, OF DES MOINES, IOWA.

MOLD FOR PLASTIC BLOCKS.

1,219,348.   Specification of Letters Patent.   Patented Mar. 13, 1917.

Application filed October 9, 1916. Serial No. 124,605.

*To all whom it may concern:*

Be it known that I, CHARLES J. PERKINS, a citizen of the United States, and resident of Des Moines, in the county of Polk and State of Iowa, have invented a certain new and useful Mold for Plastic Blocks, of which the following is a specification.

The object of my invention is to provide a mold for plastic blocks of comparatively simple, durable and inexpensive construction.

A further object is to provide in such a mold a metal pallet having a curved surface, and having a concave upper surface and having at its longitudinal edges downwardly extending flanges, the central portion of the pallet and the flanges being supported by a suitable block of wood or the like.

A further object is to provide such a mold capable of being readily and easily taken apart or secured together to form a rigid receptacle.

Still a further object is to provide in such a mold means for forming grooves in the blocks for receiving slush concrete or the like for locking the blocks together in a course.

My invention consists in the construction, combination and arrangement of the parts of the device, whereby the objects contemplated are attained, as hereinafter more fully set forth, pointed out in my claims, and illustrated in the accompanying drawings, in which:

Figure 1 shows an end elevation of one of the end members of my mold.

Fig. 2 shows a vertical, longitudinal, sectional view through the mold.

Fig. 3 shows a transverse, sectional view through the mold, the cylindrical portion at the upper edge of one of the end members being also shown in section.

Fig. 4 shows a side elevation of one of the side members of the mold.

Fig. 5 shows a perspective view of a block made in my mold.

Fig. 6 shows a top or plan view of two blocks arranged in a horizontal course, and Fig. 7 shows a side elevation of two superposed blocks.

In the accompanying drawings, I have used the reference numeral 10 to indicate the side walls of my improved mold, the outer surface of one of which is shown in Fig. 4. The side walls have in their outer surfaces near their ends notches or recesses 11. The walls of my mold are preferably made of sheet metal or the like.

On the side of each side wall 10 is a longitudinally arranged inwardly extending rib 12, as shown in Figs. 2 and 3. The ribs 12 are arranged between the upper and lower edges of the side walls. The ribs 12 may be made in a variety of ways, but as shown, they are formed integral with strips or plates 13 which rest against the inner surfaces of the side walls.

The strips or plates 13 are provided on their upper edges with recesses or notches which register with the recesses 11 on the side walls 10.

The side walls 10 are set up spaced from each other. The ribs 12 are provided near their ends with slots 14. Each rib has two slots, and the slots are preferably arranged at the same distances from the ends of the ribs. The end members of my improved mold comprise vertical plates 15 having formed at their upper edges cylinders 16, each arranged with its longitudinal axis directly above the plate 15, so that substantially half of each cylinder 16 projects on each side of its end member 15. The end members 15 are spaced between the side members 10 near the ends thereof with the side edges of said members received in the slots 14 on the opposite ribs 12.

Extended through the cylinders 16 are bolts 17 preferably screw-threaded at each end to receive wing nuts 18. The bolts 17 are received in the slots or recesses 11.

I provide locking devices comprising elongated flat strips of metal 19 having openings near their upper ends through which the ends of the bolts 17 are extended. The strips 19 hang downwardly from the bolts 17 on the outer sides of the sides 10 as shown in Fig. 3. It will be seen that when the wing nuts 18 are screwed tightly against the upper ends of the strips 19, said strips will engage the sides 10, and draw them tightly against the side edges of the end members 15, at all points from top to bottom of the latter.

I provide a wooden base 20 adapted to rest below the mold which has been heretofore described, and resting upon the base 20 which forms a part of the pallet, is a pallet member 21 made of sheet metal which is curved from its longitudinal central line upwardly to its side edges. The pallet member 21 is provided at its side edges with downwardly extending flanges 22 which rest upon the upper surface of the base or pallet member 20. The pallet member 21 is secured to the base 20 by means of screws 23 extended through the central portion of the pallet member 21, and screwed into the base 20 and having their edges countersunk in the upper surfaces of the member 21.

The plates 13 terminate at their lower edges at such points as to not interfere or be interfered with by the pallet member 21, as clearly illustrated in Fig. 3.

Concrete may be poured into the mold after the latter has been assembled in the manner hereinbefore described, and may be tamped and cured as desired.

It will readily be seen that the block 24 will be formed with one flat surface and with a curved outer surface, as shown. In this connection it may be noted that the side walls 10 are preferably inclined slightly from their lower edges upwardly and inwardly, so that the side edges of the blocks in the mold are slightly beveled, whereby is made a block peculiarly adapted for building circular structures.

The block 24 has in its ends near its flat surfaces, grooves 26 extending across the block from side to side and in its side edges grooves 27 extending across the block from end to end.

In this connection it will be noted that when two blocks are placed side by side a complete cylindrical opening will be formed by the adjacent grooves 27, as shown in Fig. 6. On the other hand when one block is placed above the other, the grooves 26, which are opposite each other, do not form a completely walled opening. This is due to the fact that only one-half of the cylinder 16 extends into the block being molded. It will, therefore, be seen that the openings formed between the grooves 27 may be filled from above in a course of masonry by pouring slush concrete therein.

On the other hand since the grooves 26 are arranged horizontally in the course, it would be difficult to fill them if they were walled all around, and the cylinders 16 are provided so arranged that there will be a horizontal slot, indicated at B in Fig. 7, between the two adjacent blocks on the inner surfaces thereof, through which slush concrete can be poured for filling the grooves 26 and bonding the blocks together and forming a curved surface on the interior of the wall or other circular structure built from the blocks. It will readily be seen that after the block has been made round and set, the nuts 18 can be loosened and the end members 15 removed, after which the side members can be removed and the block can be carried away on the pallet to cure.

It will readily be seen that the mold could be used if the bolts 17, had heads at one end.

Some changes may be made in the construction and arrangement of the parts of my improved mold without departing from the essential features and purposes thereof, and it is my intention to cover by this application any such changes which may be included within the scope of my claims.

I claim as my invention:

1. A mold comprising side walls, inclined from their lower edges upwardly and slightly inwardly, said walls being provided with horizontal ribs on their inner sides spaced from their top and bottom edges, said ribs being provided with vertical slots, said side walls being provided with notches in their upper edges, end members comprising plates having formed at their upper edges substantially cylindrical members, said end members being placed between said side members at the ends thereof, and being partially received in the slots in said ribs, bolts extended through said substantially cylindrical members and received in the slots in said side members, said bolts having screw-threaded ends, and nuts on said bolts.

2. A mold comprising side walls, inclined from their lower edges upwardly and slightly inwardly, said walls being provided with horizontal ribs on their inner sides spaced from their top and bottom edges, said ribs being provided with vertical slots, said side walls being provided with notches in their upper edges, end members comprising plates having formed at their upper edges substantially cylindrical members, said end members being placed between said side members at the ends thereof and being partially received in the slots in said ribs, bolts extended through said substantially cylindrical members and received in the slots in said side members, said bolts having screw-threaded ends, nuts on said bolts, and engaging devices mounted on said bolts outside said side members and extending downwardly for engaging the outer surfaces of the side members.

3. In a mold for blocks, mold walls, a pallet comprising a base and pallet member, having its surfaces curved from its central longitudinal center toward its side edges, and provided with downwardly extending flanges at its side edges resting upon said base, and means for securing said last described pallet member on said base.

Des Moines, Iowa, April 5, 1916.

CHARLES J. PERKINS.

Copies of this patent may be obtained for five cents each, by addressing the "Commissioner of Patents, Washington, D. C."